United States Patent

Chiba et al.

[11] Patent Number: 5,925,404
[45] Date of Patent: Jul. 20, 1999

[54] MANUFACTURING METHOD OF MAGNETIC MATERIAL FOR METALLIC THIN FILM MAGNETIC RECORDING MEDIA AND METALLIC THIN FILM MAGNETIC RECORDING MEDIUM

[75] Inventors: Kazunobu Chiba; Tustomu Takeda, both of Miyagi; Hiroyuki Yamada; Hideo Katagiri, both of Aichi; Hiroshi Osumi, Saitama, all of Japan

[73] Assignee: Sony Corporation, Tokyo, Japan

[21] Appl. No.: 08/944,478

[22] Filed: Oct. 6, 1997

[30] Foreign Application Priority Data

Oct. 8, 1996 [JP] Japan .................................. 8-267402

[51] Int. Cl.$^6$ ........................................................ G11B 5/66
[52] U.S. Cl. .......................... 427/128; 427/128; 427/130; 428/694 T; 428/900; 419/19; 419/31; 75/232; 75/233; 75/236; 75/237; 75/238; 75/348; 75/349; 75/350
[58] Field of Search ................................ 428/694 T, 900; 419/19, 31; 75/232, 236, 237, 233, 238, 348, 349, 350; 427/128, 129, 130

[56] References Cited

U.S. PATENT DOCUMENTS 5,397,373  3/1995  Tomioka ................................... 75/232
5,561,833 10/1996  Tomioka ................................... 419/19

*Primary Examiner*—Leszek Kiliman
*Attorney, Agent, or Firm*—Hill & Simpson

[57] ABSTRACT

The quantity of impurities in a magnetic material is decreased to produce a magnetic material with good quality, and a decrease in the cost of the magnetic material is realized by desulfurization. A magnetic raw material for metallic thin film magnetic recording media which contains sulfur more than 20 ppm is desulfurized to obtain the magnetic material for metallic thin film magnetic recording media with the sulfur content adjusted to 20 ppm or below, and a metallic thin film magnetic recording medium having a magnetic layer vaporized thereon with the magnetic material is fabricated.

8 Claims, 1 Drawing Sheet

MANUFACTURING METHOD OF MAGNETIC MATERIAL FOR METALLIC THIN FILM MAGNETIC RECORDING MEDIA AND METALLIC THIN FILM MAGNETIC RECORDING MEDIUM

BACKGROUND OF THE INVENTION

The present invention relates to a manufacturing method of a magnetic material for metallic thin film magnetic recording media and a metallic thin film magnetic recording medium.

Known well typically hitherto is a coated magnetic recording medium manufactured by coating a magnetic paint obtained from dispersing a pulverized magnetic material such as oxide magnetic powder or alloy magnetic powder into an organic binder such as vinyl chloride-vinyl acetate group copolymer, polyester resin, urethane resin, polyurethane resin or the like on a nonmagnetic support and drying the same.

On the other hand, in accordance with an increase in requirement for high-density magnetic recording, proposed to a general attention is a so-called metallic magnetic thin film type magnetic recording medium with a metallic magnetic material such as Co—Ni alloy, Co—Cr alloy, Co—O or the like adhered directly onto a nonmagnetic support such as polyester film or the like by means of vacuum thin film formation through plating, vacuum evaporation, sputtering, ion plating or the like.

These metallic magnetic thin film type magnetic recording media are superior in coercive force, squareness ratio or the like, and are then not only superior in electromagnetic conversion characteristic at short wavelengths but also advantageous to have merits that a loss of thickness to arise at the time of record demagnetizing and playback is considerably minimized because the thickness of magnetic layers can be extremely thinned, and that a charging density of magnetic materials can be enhanced because a binder or nonmagnetic material need not be mixed into the magnetic layers.

Further, in case where a magnetic layer is formed for improving an electromagnetic conversion characteristic of the metallic magnetic thin film type magnetic recording medium, thereby obtaining larger outputs, a so-called diagonal vapor coating whereby the magnetic layer is coated diagonally has already been developed.

The diagonal vapor coating has realized superior magnetic characteristic and electromagnetic conversion characteristic by using only the vaporization component diagonally incident from shutting off the vapor by means of a shutter, mask or the like.

However, the diagonal vapor coating is not necessarily preferable to allow a vapor of the magnetic material onto a nonmagnetic support at 10 to 20% at most at the time of vaporization, thus resulting in an unsatisfactory availability of the magnetic material. Consequently, a reduction in cost of the magnetic material is required in this case.

Still further, as disclosed in Japanese Patent Unexamined Publication No. 63-195234 and Japanese Patent Unexamined Publication No. 7-54069, generally an evil influence is quite unavoidable on the vaporized magnetic material in magnetic characteristic and electromagnetic conversion characteristic after formation of a thin film due to the quantity of impurities contained therein such as carbon, Al, Mn, oxygen and others, therefore a considerably severe requirement is given to the purity thereof.

For example, in the case where a vapored tape is fabricated by means of Co alloy as a magnetic material, it is known that the quantity of oxygen contained in the Co alloy may exert an influence on a stability of the magnetic material at the time of vapor deposition and a tape characteristic such as dropout or the like, and thus it is necessary for securing the tape characteristic that the oxygen content in the Co alloy be minimized as low as possible.

For this end, various techniques such as vacuum melting, addition of deoxidizer at the time of melting and the like have ever been taken as a means available for removing oxygen forcedly when the Co alloy is molten. Then, the addition of deoxidizer may be pointed out particularly as an effective means, however, the large quantity of remaining deoxidizer may exert an evil influence on the tape characteristic, therefore a selection of means for removing oxygen in the Co alloy has been regarded as important.

However, to employ such means as will enhance the purities is fundamentally to increase number of processes, thus leading to a higher costing. Further, if the material of high purity is used from the beginning as hitherto, a higher costing of the raw material will be incidental thereto, and an increase in the number of processes and a higher costing of the raw material are both unavoidable in consequence, thus leading to a rise of the tape cost.

Still further, it is conceivable that a low purity of cobalt working as a raw material be used as a means for suppressing the cost of Co alloy as low as possible. However, since an impurity or sulfur above all is contained much in the cobalt of low purity, a crack is capable of arising during working at the time of melting, and a deterioration of workability results inevitably therefrom to uselessness after all.

SUMMARY OF THE INVENTION

Now, therefore, this invention has been proposed in view of the actual circumstances prevailing hitherto, wherein a magnetic material for metallic thin film magnetic recording media is obtained from desulfurizing a magnetic raw material for metallic thin film magnetic recording media wherefore a magnetic thin film is formed according to a vacuum evaporation onto a nonmagnetic support, and then a metallic thin film magnetic recording medium is fabricated by using the magnetic material desulfurized.

The manufacturing method of this invention for obtaining a magnetic material for metallic thin film magnetic recording media is to obtain the magnetic material for metallic thin film magnetic recording media with a sulfur content kept at 20 ppm or less by desulfurizing a magnetic raw material for metallic thin film magnetic recording media the sulfur content of which is more than 20 ppm.

Further, the present invention is to provide a metallic thin film type magnetic recording medium with a magnetic layer by using a magnetic material for a metallic thin film type magnetic recording medium whose sulfur content is less than 20 ppm and which is made by desulfurizing a magnetic ray material, whose sulfur content is more than 20 ppm, for a metallic thin film type magnetic recording medium.

According to this invention, fall, dropout or the like of the magnetic layer due to a splash or the like at the time of vapor coating can be suppressed, and a manufacturing cost of the metallic thin film magnetic recording medium can be reduced as well.

DETAILED DESCRIPTION OF THE PREFERRED EMBODIMENTS

Figure 1:
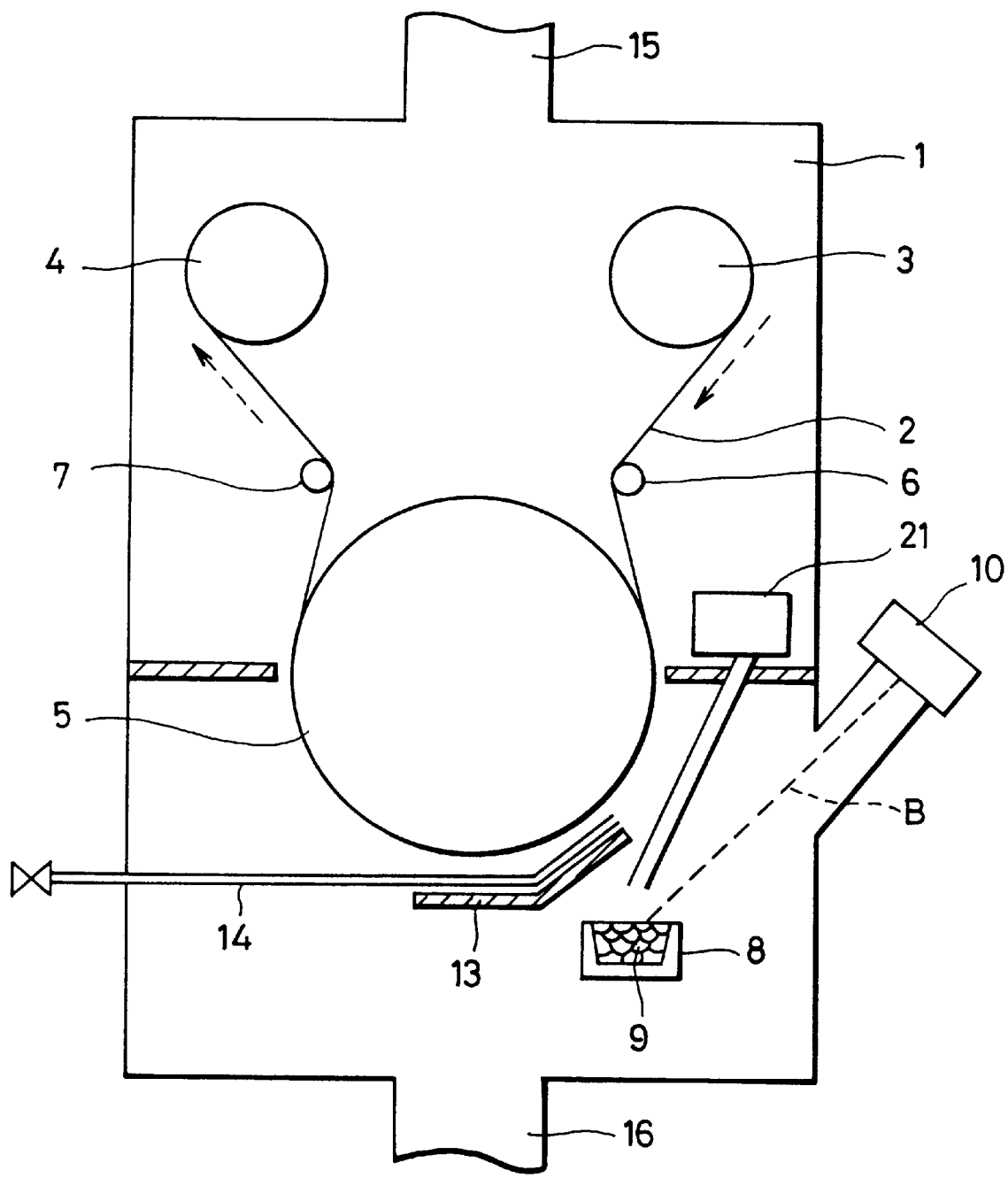
FIG. 1 is a schematic diagram showing one example of a vapor coating or evaporation device for fabricating a metallic magnetic thin film type magnetic recording medium according to the present invention.

Concrete inventive examples of the present invention will be described hereunder, however, the invention is not necessarily limited to the examples given below.

Magnetic materials evaporated onto nonmagnetic supports which are used in inventive examples 1 to 4 and comparative examples 1 to 4 are obtained from melting and scouring magnetic raw materials shown in the following Table 1 and Table 2 by a high-frequency induction heating set up in 0.1 Pa vacuum.

Here, in inventive examples 1 and 2 and comparative Examples 2 and 4, magnetic raw material B shown in Table 1 is used, while in comparative example 1, magnetic raw material A shown in Table 1 is used.

A density of impurities contained in the magnetic raw materials A and B is as shown in Table 1.

TABLE 1

| | | IMPURITY CONTENT | |
|---|---|---|---|
| element | unit | MAGNETIC RAW MATERIAL A | MAGNETIC RAW MATERIAL B |
| C | ppm | 20 | 60 |
| Si | ppm | 30 | 100 |
| Mn | ppm | 30 | 100 |
| S | ppm | 10 | 100 |
| Al | ppm | 10 | 500 |
| O | ppm | 50 | 200 |
| N | ppm | 20 | 200 |
| Ni | ppm | 300 | 1500 |
| Co | wt % | remnant | remnant |
| RAW MATERIAL ALLOY COST | | expensive | inexpensive |

CO: remnant (remainder) after subtracting contents of other elements

Further, a density of impurities of the magnetic raw materials used in inventive examples 3 and 4 and comparative example 3 is shown in Table 2.

TABLE 2

| element | unit | Inventive examples 3, 4 and Comparative example 3 |
|---|---|---|
| C | ppm | 50 |
| Si | ppm | 80 |
| Mn | ppm | 100 |
| S | ppm | 110 |
| Al | ppm | 300 |
| O | ppm | 150 |
| N | ppm | 200 |
| Ni | wt % | 0.14 |
| Co | wt % | remnant |

Still further, in inventive examples 1 to 4 and comparative examples 1 to 4, a deoxidizer is fed so as to remove oxygen in alloys of the magnetic raw material, however, the melting duration will be set properly so as not to allow the material used as deoxidizer to remain uselessly therein, and the quantity of deoxidizer in the magnetic material is adjusted by repeating the feed bit by bit.

Carbon is used as the deoxidizer. In this case, the carbon turns to carbon monoxide or carbon dioxide from reacting with oxygen in alloys of the magnetic raw material or oxygen in oxides existing as impurities, thus removing oxygen in the magnetic raw material, however, if the carbon remains excessively, then a splash tends to occur so often at the time of vapor deposition or evaporation, and a minute defect may arise on the magnetic layer, thus causing an increase of dropout and a deterioration of error rate. Consequently, the quantity of carbon to feed and the melting duration are adjusted so as to minimize the quantity of remaining carbon.

Next, a desulfurizing process of the magnetic raw material will be described.

In the inventive example 1, 99% Co of the magnetic raw material B in Table 1 is used, and a desulfurization is carried out such that after deoxidation by means of carbon in the alloy raw material molten at the time of vacuum melting, a scale suspended on the surface is removed, and then an equivalent amount mixture of $CaF_2$ and CaO is fed properly.

In the inventive example 2, 99% Co of the magnetic raw material in Table 1 is used, and a desulfurization is carried out also such that after deoxidation by means of carbon in the alloy raw material molten at the time of vacuum melting, the magnetic raw material is once cooled to solidification, and then a scale adhered to the surface thereof is cut and removed on machine working, a vacuum melting is carried out again, and an equivalent amount mixture of $CaF_2$ and CaO is fed properly. Namely, the vacuum melting is carried out two times under this process.

In the inventive example 3, the magnetic raw material in Table 2 is used, and a melting scouring is carried out by a high-frequency induction heating in 0.1 Pa vacuum. That which is obtained thus is divided into two, and one of the two is taken as a magnetic raw material as it stands without desulfurization, which is applied to the comparative example 3. Then, the other is molten again according to an electro-slag furnace method or sculled ESR method, and the molten magnetic material is desulfurized by means of $CaF_2$—CaO group slag to fabrication in this case. At this time, a desulfurization is carried out by changing feed rate of the $CaF_2$—CaO group slag and melting duration, thus obtaining the magnetic material of the inventive example 4.

In the ESR method, the molten $CaF_2$—CaO group slag is able to absorb and remove the sulfur into the slag while protecting the molten magnetic material from the atmosphere.

In the comparative example 1, 99.9% Co of the magnetic raw material A in Table 1 is used, and a magnetic material is fabricated by carrying out a vacuum melting by a high-frequency induction heating type vacuum melting furnace. In this case, a desulfurization is not to be effected.

In the comparative Examples 2 and 4, 99% Co of the magnetic raw material B in (Table 1) is used, and a magnetic material is obtained from carrying out a vacuum melting in a high-frequency induction heating type vacuum melting furnace. In this case, a desulfurization is also not to be effected.

An impurity content of each magnetic material of inventive examples 1 to 4 and comparative examples 1 to 4 which were obtained from the magnetic raw materials shown in Table 1 and Table 2 as described above is as shown in Table 3 in reference to the inventive examples 1 and 2 and the comparative Examples 1, 2 and 4, and also as shown in Table 4 in reference to the inventive examples 3 and 4 and the comparative Example 3.

Here, a composition ratio of Co of these magnetic materials refers to the remainder (remnant) excluding the composition ratio of impurities other than Co.

TABLE 3

| magnetic raw material used | | inventive example 1 magnetic raw material B | inventive example 2 magnetic raw material B | comparative example 1 magnetic raw material A | comparative example 2 magnetic raw material B | comparative example 4 magnetic raw material B |
|---|---|---|---|---|---|---|
| element | unit | | | | | |
| C | ppm | 25 | 10 | 10 | 40 | 30 |
| Si | ppm | 25 | 20 | 20 | 50 | 30 |
| Mn | ppm | 30 | 20 | 10 | 40 | 40 |
| S | ppm | 20 | 10 | <10 | 100 | 25 |
| Al | ppm | 40 | 20 | <10 | 200 | 50 |
| O | ppm | 10 | 10 | 10 | 80 | 10 |
| N | ppm | 10 | 10 | 10 | 50 | 10 |
| Ni | ppm | 1500 | 1500 | 300 | 1500 | 1500 |
| Co | wt % | remnant | remnant | remnant | remnant | remnant |
| pellet cost | | inexpensive | inexpensive | expensive | unable to work | expensive |

Co: remnant (remainder) after subtracting contents of other elements

TABLE 4

| element | unit | inventive example 3 | inventive example 4 | comparative example 3 |
|---|---|---|---|---|
| C | ppm | 30 | 20 | 10 |
| Si | ppm | 30 | 20 | 20 |
| Mn | ppm | 40 | 30 | 30 |
| S | ppm | 15 | 10 | 90 |
| Al | ppm | 40 | 30 | 50 |
| O | ppm | 15 | 10 | 40 |
| N | ppm | 20 | 20 | 10 |
| Ni | ppm | 1400 | 1400 | 1400 |
| Co | wt % | remnant | remnant | remnant |

Co: remnant (remainder) after subtracting contents of other elements

Co: remnant (remainder) after subtracting contents of other elements.

Further, composition values of the magnetic raw materials and the magnetic materials were measured by means of an IPC emission spectral type measuring instrument manufactured by Shimazu Corporation, combustion infrared absorption process and others.

The magnetic materials fabricated from magnetic raw materials as described above are formed each to the shape of 10.5 mm cylinder by hot rolling. Then, the magnetic materials are subjected to cutting work for removing oxide layers left on the surface thereof, and machined by shearing to the cylindrical form with 10 mm diametral and 12 mm long or 10 mm diametral and 26 mm long.

Since a cutting oil is not used for machining them to the cylindrical form as described above, it is washed off and removed in neutral cleanser and further in pure water. The material dried thereafter is applied to a vapor depositing magnetic material.

One example of a vapor depositing device for forming a metallic thin film on a nonmagnetic support will be described.

As shown in FIG. 1, the device is provided with a feed roll 3 rotating clockwise and a take-up roll 4 rotating clockwise in FIG. 1 within a vacuum chamber 1 vacuumized internally by being exhausted through exhaust ports 15 and 16 provided on the top and the bottom thereof respectively, a tape-like nonmagnetic support 2 running sequentially from the feed roll 3 to the take-up roll 4.

A cooling can 5 is provided in the middle of the path for the nonmagnetic support 2 to travel from the feed roll 3 to the take-up roll 4. The cooling can 5 is provided so as to draw out the nonmagnetic support 2 downward in FIG. 1, rotating clockwise in construction. By the way, the feed roll 3, the take-up roll 4 and the cooling can 5 are cylindrical each to have almost the same width as that of the nonmagnetic support 2, and a cooling device (not shown) is provided on the cooling can 5, which operates to suppress a deformation of the nonmagnetic support 2 due to temperature rise or the like.

An arrangement is such that the nonmagnetic support 2 is delivered sequentially from the feed roll 3, passes a peripheral surface of the cooling can 5, and is wound on the take-up roll 4. Guide rolls 6 and 7 are disposed between the feed roll 3 and the cooling can 5 and between the cooling can 5 and the take-up roll 4 respectively, and so constructed as to give a predetermined tension to the nonmagnetic support 2 running extendedly from the feed roll 3 to the cooling can 5 and from the cooling can 5 to the take-up roll 4, thus keeping the nonmagnetic support 2 running smoothly at all times.

Further, a crucible 8 is provided within the vacuum chamber 1 under the cooling can 5, and a vaporization source charged with a metallic magnetic material 9 for forming a metallic magnetic thin film is disposed within the crucible 8.

A pelletized magnetic material is fed to the crucible 8 from a magnetic material feed mechanism 21 for replenishing the metallic magnetic material 9 decreased according to a vapor deposition.

On the other hand, an electron gun 10 for heating and vaporizing the vaporization source, namely, the metallic magnetic material 9 charged within the crucible 8 is mounted on a side wall portion of the vacuum chamber 1. The electron gun 10 is disposed at a position where an electron beam B emitted therefrom will be irradiated on the metallic magnetic material 9 within the crucible 8. Then the metallic magnetic material 9 evaporated by irradiation of the electron beam B is vaporized onto the nonmagnetic support 2 running along the peripheral surface of the cooling can 5 at a constant speed, and thus adhered to form a magnetic layer thereon.

Further, a shutter 13 is disposed in the vicinity of the cooling can 5. The shutter 13 is formed to cover a predetermined domain of the nonmagnetic support 2 running at a constant speed along the peripheral surface of the cooling can 5, and an arrangement is such that a vapor of the metallic magnetic material 9 is vaporized diagonally to the nonmagnetic support 2 in a predetermined angular range by the shutter 13.

Still further, for such vapor deposition, an oxygen gas is supplied to the surface of the nonmagnetic support 2 by way of an oxygen gas introduction port 14 passing through the side wall of the vacuum chamber 1, thus enhancing magnetic characteristic, durability and weatherability.

In the inventive examples 1 to 4 and the comparative examples 1 to 4, a diagonal vapor deposition is carried out onto the nonmagnetic support in the oxygen atmosphere under the condition given in Table 5 by means of the vapor deposition device constructed as above.

TABLE 5

| item | contents/particulars |
| --- | --- |
| nonmagnetic support | polyethylene terephthalate 10 μm 150 mm width |
| undercoat | water-soluble latex with ester acrylate as principal component applied at density 10 million pcs/mm² |
| magnetic material for vapor deposition | described in (table 3) and (table 4) |
| incident angle | 45 to 90 degrees |
| nonmagnetic support transfer velocity | 25 m/min |
| magnetic layer thickness | 200 nm (monolayer structure) |
| quantity of oxygen introduced | 250 cc/min |
| vacuum degree at vapor deposition | 7 × 10 2 pa |
| back coat | carbon-urethane binder mixed group/thickness applied: 0.6 μm |
| top coat | perfluoropolyether applied |
| cut width | 6.35 mm |

After formation of the magnetic layer, a back coat layer and a top coat layer are formed as in the case of a normal metallic thin film magnetic recording medium, and the medium thus obtained is cut to a predetermined tape width shown in Table 5, thereby fabricating a sample tape.

Each sample tape fabricated as above was subjected to a measurement of dropout, magnetic characteristic deterioration, error rate and electromagnetic conversion characteristic.

Then, for the dropout test, with an output fall at—16 dB 20 μsec or over from a reproduction output level taken as a dropout, the measurement was made for 10 minutes by means of a DCR-VX1000 remodeled machine, manufactured by Sony Corporation, thus obtaining the dropout number per minute.

As for the error rate, the measurement was made also on the same DCR-VX1000 remodeled machine manufactured by SONY Corporation. The error rate may occur generally from a lack of signals 1 byte (=8 bits) or below which is called a random error depending on sizes of the electromagnetic conversion characteristic. In each inventive example and comparative example described above, the identical nonmagnetic support is used, and also the identical magnetic raw material is used on that which may exert an influence on the electromagnetic conversion characteristic other than the magnetic material, therefore it can be decided that the random error rate is on the same level in each inventive example and comparative example. However, in case it is caused by something large comparatively like a fall of the magnetic layer or deposits, an error called burst error may arise. The burst error is defined as arising from a fall of data in several byte length or over, however, in each inventive example and comparative example, a total error rate of the random error rate and the burst error rate was measured.

In reference to the electromagnetic conversion characteristic, the measurement was made also by means of the DCR-VX1000 remodeled machine of Sony make. Values of the electromagnetic conversion characteristic were compared with the regenerative output (½T:λ(wavelength)= 0.5 μm) in [Comparative Example 1] at 0 dB.

Further, the measurement of a deterioration of the magnetic characteristic was effected on a gas corrosion testing machine, wherein a saturation magnetization ($\phi$s) after 24-hour conservation in the atmosphere 35° C. 90% RH (relative humidity) including $SO_2$ gas at 0.6 ppm is measured, and the deterioration rate ($\Delta\phi$s) was obtained according to the following formula:

$$\Delta\phi s=[(\phi s_1-\phi s_2)/\phi s_1]\times 100(\%)$$

Provided: $\phi s_1$ indicates the measured value before conservation; $\phi s_2$ indicates the measured value after conservation.

Each measured result of dropout, magnetic characteristic deterioration, error rate and electromagnetic conversion characteristic in the inventive examples 1 to 4 and the comparative examples 1 to 4, tape costs and appreciation results on a condition of the splash at the time of vapor deposition are shown in Table 6.

Then, in regard to the tape costs given in Table 6, as compared with the cost when the vaporized tape is fabricated by using the 99.9% Co magnetic raw material in the prior art, the cheap one is indicated by ◯, and the expensive one is indicated by X.

Further, regarding the condition of splashes at the time of vapor deposition which is shown in Table 6, that in which the splash is not generated is indicated by ◎, that of being one or less for one minute is indicated by ◯, that of being one to two for one minute is indicated by Δ, and that of being 10 or so for one minute is indicated by □. Further, those with—in the comparative example 2 are such ones as were not for measurement because crack and break occurred in the pellet making process, and hence were not for machining.

TABLE 6

| | drop-out pc./min. | magnetic characteristic deterioration % | error rate ×10⁻⁵ | electronic conversion characteristic dB | tape cost | splash at evaporation |
| --- | --- | --- | --- | --- | --- | --- |
| inventive example 1 | 5.8 | −6.6 | 4.9 | +0.2 | ◯ | Δ |
| inventive example 2 | 2.4 | −6.0 | 3.8 | −0.1 | ◯ | ◯ |
| inventive example 3 | 5.2 | −6.2 | 4.4 | 0 | ◯ | ◯ |
| inventive example 4 | 4.8 | −6.0 | 4.0 | +0.2 | ◯ | ◯ |
| comparative example 1 | 4.6 | −6.2 | 4.1 | 0 | X | ◎ |
| comparative example 2 | unable to measure | unable to measure | unable to measure | unable to measure | — | — |
| comparative example 3 | 4.6 | −8.2 | 5.1 | −0.1 | X | □ |
| comparative example 4 | 19.8 | −10.2 | 13 | −0.1 | ◯ | □ |

As shown in Tables 3, 4 and 6, the magnetic materials of the inventive examples 1 to 4 are all 20 ppm or below in the content of sulfur, and in each of the comparative examples 2 to 4, the sulfur content is more than 20 ppm both. From comparing the inventive Examples 1 to 4 with the comparative examples 2 to 4, it is understood that the metallic thin film magnetic recording medium having a magnetic layer formed by using the magnetic material for metallic thin film magnetic recording media with the sulfur content adjusted to 20 ppm or below is superior in conservation characteristic and electromagnetic conversion characteristic, thus realizing such metallic thin film magnetic recording medium as is minimized in error rate, and that lack and deposit of the magnetic layer due to splash or the like at the time of vapor coating can be suppressed.

Further, the comparative example 1 represents that a magnetic material is fabricated by using the magnetic raw material A, or 99.9% Co which is shown in Table 1, and a vapor deposition of the magnetic layer is carried out by using the same. In this connection, since the content of impurities in the material is little beforehand, the content of sulfur of the magnetic material is less than 10 ppm as shown in Table 3, however, the magnetic raw material A, or 99.9% Co is itself expensive, and also becomes high-priced if worked to the magnetic material used at the time of vapor deposition, therefore while the characteristic as a magnetic recording medium is good, a fault is that a product cost is boosted thereby after all.

Then, in the comparative example 2, when the magnetic material was fabricated according to the process described above, a crack or a break occurred in the process of drawing it to have wires 10.5 mm in diameter each for fabricating pellets, and thus the magnetic material could not be worked to a pellet shape for use with vapor deposition. Consequently, the comparative example 2 in Table 3 is that in which the impurity content during the above drawing process to the wire with a diameter of 10.5 mm is measured.

From comparing the inventive example 3 and the comparative example 3, it is apparent that the inventive Example 3 wherein the magnetic raw material is molten to smelting by a high-frequency induction heating in the 0.1 Pa vacuum, then molten again by the ESR method, and the molten magnetic material is desulfurized by means of $CaF_2$—CaO group slag in this case is superior in magnetic characteristic, error rate, electromagnetic conversion characteristic. Further, decrease in splashes at the time of vapor deposition can also be realized.

In the inventive example 3, a desulfurization was carried out according to the ESR method, and a remaining quantity of the desulfurizing material in the magnetic material could be minimized as compared with the case where the magnetic material was fabricated according to desulfurization at the time of vacuum melting like the inventive example 1.

The reason is that the desulfurizing material is suspended at the time of melting and hence is easy to remove according to the ESR method.

For the above-described inventive examples and comparative examples, melting and smelting were carried out according to a high-frequency induction heating, however, the invention is not necessarily limited to these examples, and processes such as an arc melting, an EB (electron beam impulse) melting method and the like can also be employed.

While the metallic magnetic thin film is formed as a magnetic layer on the above-described nonmagnetic support by directly depositing a strong magnetic metallic material thereto, the metallic magnetic material may be selected properly from among those which are applied to normal vapored magnetic recording media.

For example, strong magnetic metals such as Fe, Co, Ni and the like may be taken up along with strong magnetic alloys such as Fe—Co, Co—Ni, Fe—Co—Ni, Fe—Cu, Co—Cu, Co—Au, Co—Pt, Fe—Cr, Co—Cr, Ni—Cr, Fe—Co—Cr, Co—Ni—Cr, Fe—Co—Ni—Cr and the like. These may be a monolayer film or a multilayer film.

Further, the nonmagnetic support may use any material known hitherto, and taken up therefor, for example, are vinyl group resins, polyesters including polyethylene terephthalate or the like, polyolefines including polyethylene and polypropylene or the like, cellulose derivatives including cellulose triacetate or the like, polyvinyl chloride and others.

Still further, an underlayer or an interlayer may be provided for improving an adhesion force between the nonmagnetic support and the metallic magnetic thin film or an interlayer adhesion force in the case of multilayer film and also for controlling a coercive force or the like. Then, the magnetic layer may be oxidized in the vicinity of its surface for improving a corrosion resistance and so forth.

A means for forming the metallic magnetic thin film may depend on vacuum vaporization process for heating and evaporating the strong magnetic material under vacuum and depositing the same it onto the nonmagnetic support, and ion plating, or a so-called PVD process for vaporizing the strong magnetic metallic material in electric discharge.

Further, a protective film layer may be formed on the strong magnetic metallic material formed on the above-described magnetic support. Any material may be selected for such material provided it is used generally as a normal protective film for the metallic magnetic thin film. For example, carbon, $CrO_2$, $Al_2O_3$, BN, Co oxide, MgO, $SiO_2$, $Si_3O_4$, $SiN_x$, SiC, $SiN_x$—$SiO_2$, $ZrO_2$, $TiO_2$, TiC and so forth will be taken up therefor. The film layer may be a monolayer film thereof, or a multilayer film or a compound film with metals.

A construction of the magnetic recording medium and chiefly the magnetic tape relating to the present invention is not particularly limited to the examples described above, and various changes and modifications may be made without departing from the gist of the invention. For example, therefore, it is possible without any problem that a back coat layer is formed as occasion demands, an undercoat layer is formed on the nonmagnetic support, and that a layer of lubricant or anticorrosive is formed. In this case, any materials well known hitherto can be used for nonmagnetic pigment and resin binder included in the back coat layer or for such material as is included in lubricant, anticorrosive and others.

The present invention comprises fabricating a magnetic material with the sulfur content adjusted to 20 ppm or below through desulfurization by adding a desulfurizer to a magnetic raw material for metallic thin film magnetic recording media which contains sulfur more than 20 ppm at the time of vacuum melting, or by using a slag of the desulfurizer at the time of melting according to electro-slag remelting or so-called the ESR method, and fabricating a metallic thin film magnetic recording medium by using the magnetic material obtained as above.

According to the invention, since the content of sulfur in the magnetic material for vapor deposition of a magnetic layer can be decreased, a fall and dropout or the like of the magnetic layer due to a splash at the time of vapor deposition can be suppressed. Further, in case where a magnetic raw material relatively low in Co purity or the Co 99% raw material, for example, is used beforehand, the metallic thin film magnetic recording medium having the characteristics equivalent to the case where such a material as is high in Co purity, or, for example, the Co 99.9% raw material is used can be fabricated. Consequently, a manufacturing cost of the magnetic raw material for metallic thin film magnetic recording media and the metallic thin film magnetic recording medium can remarkably be reduced.

According to the present invention, since the content of sulfur in a magnetic material for vapor deposition of a magnetic layer can be decreased, fall and dropout or the like of the magnetic layer due to splashes at the time of vapor deposition can be suppressed. Further, even in case where a magnetic raw material relatively low in Co purity, or, for example, a Co 99% magnetic raw material is used, a metallic thin film magnetic recording medium having the magnetic characteristic equivalent to the case where a material with high Co purity is used can be fabricated. Thus, a drastic decrease in a manufacturing cost of the magnetic material for metallic thin film magnetic recording media and the metallic thin film magnetic recording medium can be realize.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method for making a magnetic material for a metallic thin film magnetic recording medium comprising the steps of:

providing a magnetic raw material for a metallic thin film magnetic recording medium containing more than 20 ppm of sulfur; and desulfurizing the magnetic raw material to provide a desulfurized magnetic material containing less than or equal to 20 ppm of sulfur.

2. A method as defined in claim 1, wherein said desulfurizing step is performed in an electro-slag furnace method.

3. A method as defined in claim 1, wherein said desulfurizing step further comprises heating the magnetic raw material to form a melt under vacuum conditions and treating the melt with an equivalent mixture of $CaF_2$ and CaO.

4. A method as defined in claim 1, further comprising the step of deoxidizing the magnetic raw material before desulfurizing.

5. A method as defined in claim 1, further comprising the step of deoxidizing the magnetic raw material by heating the magnetic raw material to form a melt under vacuum conditions and treating the melt with a deoxidizing amount of carbon.

6. A method for making a metallic thin film magnetic recording medium comprising the steps of:

providing a magnetic raw material for a metallic thin film magnetic recording medium containing more than 20 ppm of sulfur;

desulfurizing the magnetic raw material to provide a desulfurized magnetic material containing less than or equal to 20 ppm sulfur; and thereafter, vapor depositing said desulfurized magnetic material onto a non-magnetic support to form a metallic thin film magnetic layer on a surface of the non-magnetic support to provide said metallic thin film magnetic recording medium.

7. A method as defined in claim 6, wherein said desulfurizing step is performed in an electro-slag furnace method.

8. A method as defined in claim 6, wherein said vapor depositing step is performed using a diagonal vapor deposition method.

* * * * *